United States Patent
Chen et al.

(10) Patent No.: US 9,588,378 B2
(45) Date of Patent: Mar. 7, 2017

(54) DISPLAY PANEL AND ITS MANUFACTURING METHOD AND A DISPLAY

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Zhenxia Chen, Beijing (CN); Ni Jiang, Beijing (CN); Junrui Zhang, Beijing (CN); Junhwan Lim, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 309 days.

(21) Appl. No.: 14/375,648

(22) PCT Filed: Oct. 23, 2013

(86) PCT No.: PCT/CN2013/085810
§ 371 (c)(1),
(2) Date: Jul. 30, 2014

(87) PCT Pub. No.: WO2014/205968
PCT Pub. Date: Dec. 31, 2014

(65) Prior Publication Data
US 2016/0187685 A1 Jun. 30, 2016

(30) Foreign Application Priority Data
Jun. 28, 2013 (CN) .......................... 2013 1 0270127

(51) Int. Cl.
*G02F 1/153* (2006.01)
*G02F 1/1339* (2006.01)
(Continued)

(52) U.S. Cl.
CPC .......... *G02F 1/1339* (2013.01); *G02F 1/1337* (2013.01); *G02F 1/1341* (2013.01);
(Continued)

(58) Field of Classification Search
CPC . G02F 1/1339; G02F 1/133514; G02F 1/1341
(Continued)

(56) References Cited

U.S. PATENT DOCUMENTS

| 4,068,923 A * | 1/1978 | Toida ................. G02F 1/133345 |
| | | 252/299.4 |
| 6,493,050 B1 * | 12/2002 | Lien .................. G02F 1/133514 |
| | | 349/106 |
| 2009/0289260 A1 | 11/2009 | Sonoda et al. | |

FOREIGN PATENT DOCUMENTS

| CN | 101196635 A | 6/2008 |
| CN | 101673008 A | 3/2010 |

(Continued)

OTHER PUBLICATIONS

First Chinese Office Action Appln. No. 201310270127; Dated Apr. 30, 2015.
(Continued)

*Primary Examiner* — Lucy Chien
(74) *Attorney, Agent, or Firm* — Ladas & Parry LLP

(57) ABSTRACT

The present invention relates to a display panel having a display region and a non-display region, comprising: a first substrate and a second substrate oppositely provided and a layer of liquid crystal molecule located between the first substrate and the second substrate, wherein the first substrate and the second substrate each are provided with an align-
(Continued)

ment film at a position corresponding to the display region, and each are provided with a sealant region for applying sealant at a position corresponding to the non-display region, wherein: the sealant region on a surface of the first substrate facing the liquid crystal molecule layer is provided with a first raised layer by which the sealant region of the first substrate is higher than the display region thereof; and the sealant region on a surface of the second substrate facing the liquid crystal molecule layer is provided with a second raised layer by which the sealant region of the second substrate is higher than the display region thereof. The above display panel has improved display quality and has a narrow border at the same time.

13 Claims, 2 Drawing Sheets

(51) Int. Cl.
*G02F 1/1335* (2006.01)
*G02F 1/1337* (2006.01)
*G02F 1/1341* (2006.01)

(52) U.S. Cl.
CPC .... *G02F 1/13394* (2013.01); *G02F 1/133514* (2013.01); *G02F 1/133516* (2013.01); *G02F 1/133788* (2013.01)

(58) Field of Classification Search
USPC .......................................................... 349/153
See application file for complete search history.

(56) References Cited

FOREIGN PATENT DOCUMENTS

| | | |
|---|---|---|
| CN | 103091903 A | 5/2013 |
| CN | 103353692 A | 10/2013 |

OTHER PUBLICATIONS

International Search Report dated Aug. 3, 2014; PCT/CN2013/085810.
International Preliminary Report on Patentability issued Dec. 29, 2015, PCT/CN2013/085810.
Second Chinese Office Action dated Dec. 4, 2015; Appln. No. 201310270127.0.

* cited by examiner

DISPLAY PANEL AND ITS MANUFACTURING METHOD AND A DISPLAY

TECHNICAL FIELD

Embodiments of the present invention relate to a display panel and a manufacturing method thereof, and a display device.

BACKGROUND

During the manufacturing of a liquid crystal display device, it is difficult to obtain a desirable orientation state of liquid crystal material molecules only by injecting the liquid crystal material between two glass substrates, and therefore it is required to form alignment films in the display regions of the color filter substrate and the array substrate in the liquid crystal display device, so as to make the liquid crystal molecules regularly aligned in the initial state at a pre-inclination angle of the liquid crystal molecules.

For example, the alignment film is generally formed by transferring photo-alignment liquid onto a color filter substrate or an array substrate by using a photographic plate and then by performing conventional rubbing-orientation or photo-orientation. In the case where the photo-alignment liquid is transferred onto the color filter substrate and the array substrate by using the photographic plate, the resultant alignment film is suffered from the problems that the edge of the alignment film has a non-uniform thickness, and the aligning direction is not consistent. Therefore, in order to prevent the edge area of the alignment film from influencing the image display in the display region, the area where the photo-alignment liquid is transferred onto the color filter substrate and the array substrate to form the alignment film is larger than the area of the display region. The larger the printable range of the edge of the alignment film is, the lower the requirements on the process are, and the less the risk that the non-uniform area of the alignment film enters into the display region is.

However, in a narrow border display device, the non-display region is relatively smaller, as illustrated in FIG. 1, when the color filter substrate 01 and the array substrate 02 is cell-assembled to form a display panel, the application area for sealant 03 is likely overlapped partly with the edge of the alignment film 04; or as illustrated in FIG. 4, the edge of the alignment film 04 is extended beyond the application area for the sealant 03. The alignment film 04 may comprise an upper alignment layer for performing alignment and an underlying layer with high mechanical strength, and the upper alignment layer of the alignment film has low mechanical strength and easily to be peeled off from the sealant, resulting in that the moisture in the environment easily invades into the display panel, causing the display panel to be degraded.

SUMMARY

Embodiments of the present invention provide a display panel having a narrow border and having good display quality at same time.

Embodiments of the present invention further provide a method for manufacturing a display panel by which the display quality of the display panel is improved.

Embodiments of the present invention further provide a display device having good display quality.

According to one aspect of the present invention, a display panel having a display region and a non-display region is provided. The display panel comprises: a first substrate and a second substrate which are oppositely provided; and a layer of liquid crystal molecule located between the first substrate and the second substrate. The first substrate and the second substrate each are provided with an alignment film at a position corresponding to the display region, and the first substrate and the second substrate each are provided with a sealant region for applying the sealant at the position corresponding to the non-display region, the sealant region on a surface of the first substrate facing the liquid crystal molecule layer is provided with a first raised layer by which the sealant region of the first substrate is higher than the display region of the first substrate; the sealant region on a surface of the second substrate facing the liquid crystal molecule layer is provided with a second raised layer by which the sealant region of the second substrate is higher than the display region of the second substrate.

For example, in some optional embodiments, the first raised layer or the second raised layer is formed by stacking one layer or more layers of color filter layers of a color filter sheet.

For example, in some optional embodiments, the first raised layer and/or the second raised layer is formed from a metal material, a metal alloy material, a resin material or a photoresist material.

For example, in some optional embodiments, the above display panel may further comprise a spacer layer located between the first substrate and the second substrate, and the first raised layer or the second raised layer is formed by the spacer layer.

For example, in some optional embodiments, the above display panel may further comprise a spacer layer located between the first substrate and the second substrate, and the first raised layer or the second raised layer is formed by stacking one layer or more layers of the color filter layer of the color filter sheet and the spacer layer.

For example, in some optional embodiments, the first raised layer and the second raised layer have a thickness smaller than or equal to half of the cell gap of the liquid crystal cell.

According to another aspect of the present invention, a method for manufacturing a display panel having a display region and a non-display region is provided, the display panel comprises a first substrate and a second substrate which are oppositely provided; and a layer of liquid crystal molecule provided between the first substrate and the second substrate, portions of the first substrate and the second substrate corresponding to the non-display region are respectively provided with a sealant region for applying sealant. The method comprises: forming a first raised layer pattern in the sealant region of the first substrate such that the sealant region of the first substrate is higher than the display region of the first substrate; forming a second raised layer pattern in the sealant region of the second substrate such that the sealant region of the second substrate is higher than the display region of the second substrate; forming alignment films in the display region of the first substrate and the display region of the second substrate; cell-assembling the first substrate and the second substrate; providing liquid crystal molecules between the first substrate and the second substrate.

For example, in some optional embodiments, forming of the first raised layer pattern in the sealant region of the first substrate or forming the second raised layer pattern in the sealant region of the second substrate comprises: forming a first color filter layer pattern in the sealant region of the first substrate or the sealant region of the second substrate; forming a second color filter layer pattern on the first color filter layer pattern; forming a third color filter layer pattern on the second color filter layer pattern. The first, second and third color filter layer patterns stack to form the first raised layer pattern or the second raised layer pattern.

For example, in some optional embodiments, forming of the first raised layer pattern in the sealant region of the first substrate or forming the second raised layer pattern in the sealant region of the second substrate comprises: forming a spacer in the sealant region of the first substrate or in the sealant region of the second substrate, the spacer forming the first raised layer patter or the second raised layer pattern.

For example, in some optional embodiment, forming of the first raised layer pattern in the sealant region of the first substrate or forming the second raised layer pattern in the sealant region of the second substrate comprises: forming a layer of photoresist material in the sealant region of the first substrate and/or in the sealant region of the second substrate, and the photoresist material layer forms the first raised layer pattern or the second raised layer pattern.

For example, in some optional embodiments, respectively forming of alignment films in the display region of the first substrate and the display region of the second substrate comprises: transferring decomposition type photo-alignment liquid on the first substrate and the second substrate so that the photo-alignment liquid on the first raised layer pattern and the second raised layer pattern is flowed to the non-display region respectively between the sealant regions of the first substrate and the second substrate and the display region; irradiating the first substrate and the second substrate with UV light in a certain direction; washing the first substrate and the second substrate.

For example, in some optional embodiments, between the irradiating the first substrate and the second substrate with UV light in a certain direction and the washing the first substrate and the second substrate, the method may further comprise exposing the sealant region of the first substrate and the sealant region of the second substrate to full-polarization UV light by using a mask plate.

According to another aspect of the present invention, a display device is provided, which comprises a display panel as described in any of above items.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMERALS

| | | |
|---|---|---|
| 01: color filter substrate; | 02: array substrate; | 03: sealant region; |
| 04: alignment film; | 1: first substrate; | 11: red color filter layer pattern; |
| 12: green color filter layer pattern; | | 13: blue color filter layer pattern; |
| 2: second substrate; | 21: spacer; | 3: sealant region; |
| 4: alignment layer; | 51: first raised layer; | 52: second raised layer |

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

First Embodiment

Figure 1:
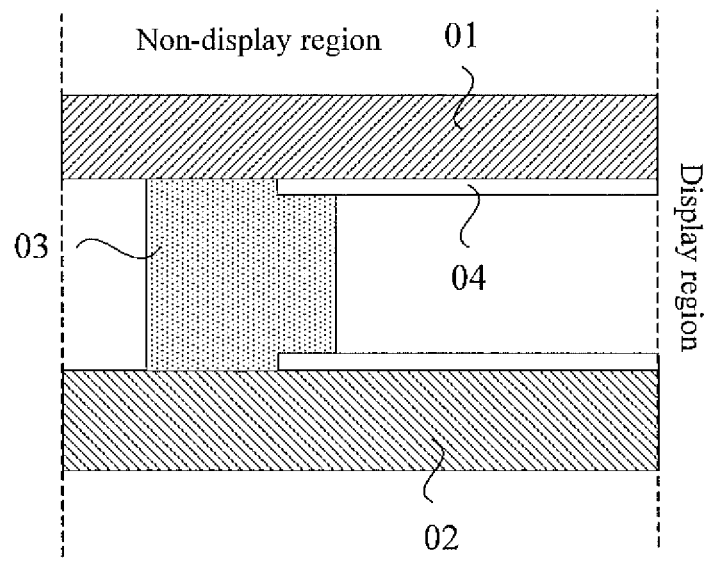
FIG. 1 is a structural schematic view showing that the application region of sealant is overlapped with the edge portion of an alignment film in a conventional display panel.
Figure 2:
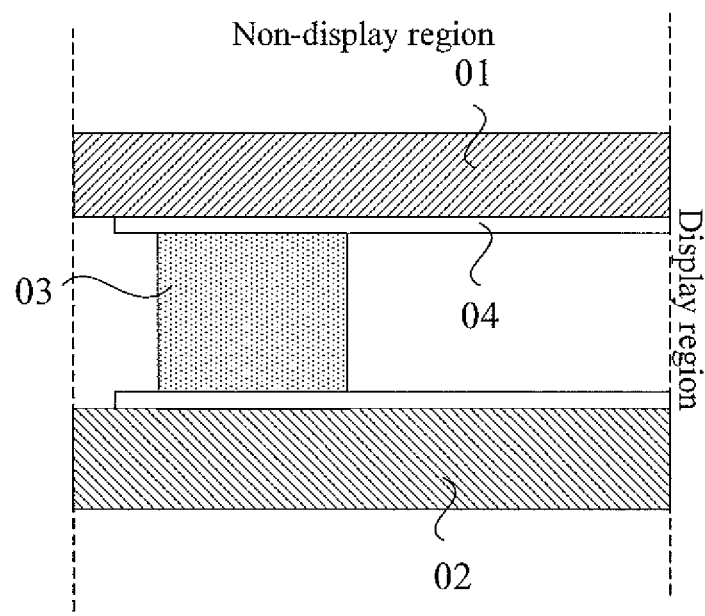
FIG. 2 is a structural schematic view showing that the edge of an alignment film is extended beyond the application region of sealant in a conventional display panel.
Figure 3:
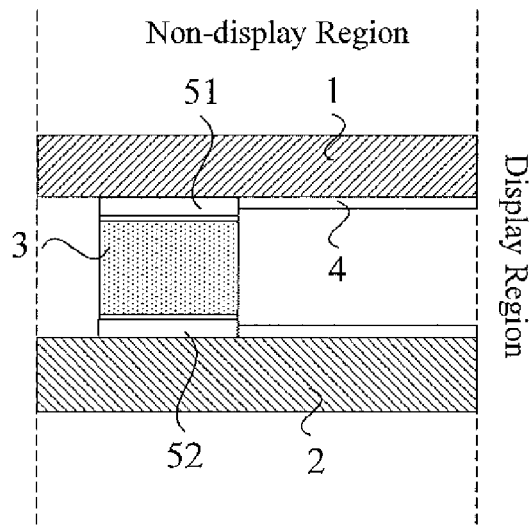
FIG. 3 is a structural schematic view showing the structure of a display panel as provided in an embodiment of the present invention.

FIG. 3 is a structural schematic view showing a display panel as provided in the embodiment of the present invention. The present embodiment provides a display panel, and the display panel comprises a display region and a non-display region, which is located, e.g., around the display region. The display panel comprises a first substrate 1 and a second substrate 2 oppositely provided; and a layer of liquid crystal molecule located between the first substrate 1 and the second substrate 2. The first and second substrate 1 and 2 both are provided with alignment films 4 at the position corresponding to the display region, and provided with sealant regions 3 for applying sealant at the position corresponding to the non-display region. The sealant regions 3 are part of the non-display region.

A first raised layer 51 is provided in the sealant region 3 on the surface of the first substrate 1 facing the liquid crystal molecule layer, and the first raised layer 51 makes the sealant region 3 of the first substrate 1 higher than the display region thereof (with reference to the first substrate 1).

A second raised layer 52 is provided in the sealant region 3 on the surface of the second substrate facing the liquid crystal molecule layer, and the second raised layer 52 makes the sealant region 3 of the second substrate 2 higher than the display region thereof (with reference to the second substrate 2).

A conventional display panel generally comprises a display region for mainly displaying image and a non-display region for wiring and applying sealant. As the border of a display panel becomes more and more narrow, the non-display region of the display panel becomes more and more small, and the requirements on the processing for printing the alignment film become more and more restrict, which requires the photo-alignment liquid be not printed into the sealant region to the greatest degree, reducing the influence by the upper alignment layer of the alignment film upon the adhesion force of the sealant.

It is noted herein that the first raised layer being higher than the display region of the first substrate means that, if the display region is regarded as a horizontal plane, the first raised layer is protruded compared to the display region, and the second raised layer being higher than the displayer region of the second substrate means that, if the displayer region is regarded as a horizontal plane, the second raised layer is protruded compared to the display region.

In the display panel as provided in the present embodiment, the sealant regions 3 of the first substrate 1 and the second substrate 2 respectively comprise the first raised layer 51 and the second raised layer 52. Due to the first raised layer 51, the sealant region 3 of the first substrate 1 is made higher than the display region of the first substrate 1, and the alignment film 4 of the first substrate 1 is located in the region surrounded by the sealant region 3 of the first substrate 1. Since there is a height difference between the first raised layer 51 and the display region of the first substrate 1 such that the alignment film 4 formed on the first raised layer 51 becomes thin, the upper alignment layer that is photo-decomposed upon a photo-orientation process disappears while the base layer having a high mechanical strength is remained, and the influence by the alignment film 4 on the first substrate 1 upon the adhesion force between the sealant and the sealant region of the first substrate is reduced. Similarly, the influence by the alignment film 4 on the second substrate 2 upon the adhesion force between the sealant and the sealant region of the second substrate 2 is also reduced.

Therefore, the display panel as provided in the present embodiment has good display quality, and can easily achieve a narrow border display device.

It is to be noted that in the following description of the embodiments of the present invention, by taking the color filter substrate as the first substrate and the array substrate as the second substrate as an example only, the display panel is described in detail, but the first substrate could be a normal substrate and the second substrate could be other display substrate such as the array substrate integrated with color filter (Color-filter On Array, COA), and there is no limitation thereon.

Figure 4:
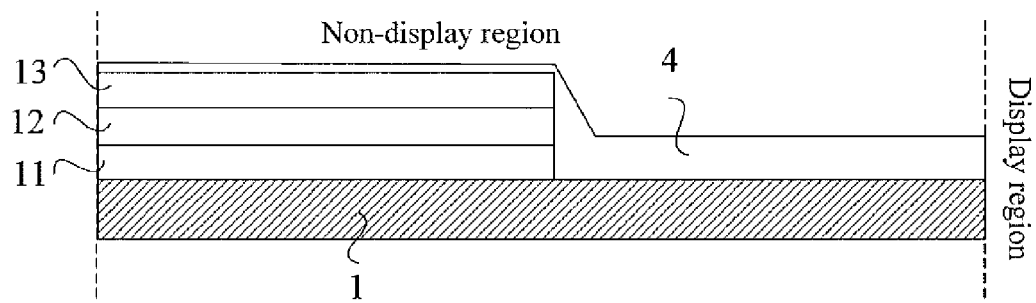
FIG. 4 is a structural schematic view showing a color filter substrate in a display panel as provided in an embodiment of the present invention.

Optionally, FIG. 4 is a structural schematic view showing an example of the color filter substrate in the display panel as provided in the present embodiment. The first raised layer 51 is formed by one layer or a multi-layer stack of the color filter layers of the color filter sheet. That is to say, the first raised layer 51 may be formed by one layer of the color filter layers of the color filter sheet, or may also be formed by two of the color filter layers of the color filter sheet, and the further detailed description is omitted.

Optionally, the first raised layer 51 and/or the second raised layer 52 is made from a metal material, a metal alloy material, a resin material, or a photoresist material.

The above display panel may further comprise spacers located between the color filter substrate and the array substrate. When the spacer layer is provided on the color filter substrate, the first raised layer 51 may be formed by the spacer layer.

Figure 5:
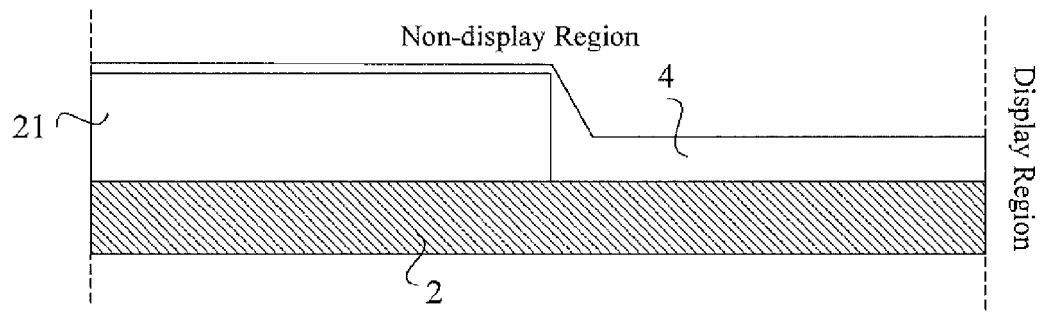
FIG. 5 is a structural schematic view showing an array substrate in a display panel as provided in an embodiment of the present invention.

With reference to FIG. 5 which is a structural schematic view showing another example of the array substrate in the display panel as provided in the present embodiment, when the spacer layer is provided on the array substrate, for example, the second raised layer 52 may be formed by the spacer layer.

The above display panel may further comprise a spacer layer located between the color filter substrate and the array substrate. When the spacer layer is formed on the color substrate, the first raised layer 51 may be formed by one layer or a multi-layer stack of the color filter layers of the color filter sheet and the spacer layer. That is to say, the first raised layer 51 may be formed by one layer of the color filter layers of the color filter sheet and the spacer layer, or the first raised layer 51 may also be formed by two layers of the color filter layers of the color filter sheet and the spacer layer, the further detailed description is omitted.

In order not to affect the cell gap of the liquid crystal cell (that is, the thickness of the space for containing the liquid crystal material between the two substrates), the first raised layer and the second raised layer have the thicknesses less than or equal to half of the thickness of the liquid crystal cell.

Second Embodiment

The embodiment of the present invention provides a method for manufacturing a display panel having a display region and a non-display region, a first substrate and a second substrate are respectively provided with sealant regions for applying sealant corresponding to the non-displayer region. The method comprises the following steps.

Step 101: forming a first raised layer pattern in the sealant region of the first substrate such that the sealant region of the first substrate is higher than the display region of the first substrate;

Step 102: forming a second raised layer pattern in the sealant region of the second substrate such that the sealant region of the second substrate is higher than the display region of the second substrate;

Step 103: forming alignment films in the display region of the first substrate and the display region of the second substrate;

Step 104: cell-assembling the first substrate and the second substrate;

Step 105: providing liquid crystal molecules between the first and second substrate.

In the method for manufacturing the display panel as provided in the embodiment of the present invention, when the alignment film is printed, since there is a height difference between the first raised layer pattern and the display region of the first substrate such that the alignment film formed on the first raised layer pattern becomes thin, in this part of the alignment film, the upper alignment layer that is photo-decomposed when a photo-orientation process disappears while the base layer having a high mechanical strength is remained, which reduces the influence by the alignment film upon the adhesion force of the sealant. Similarly, the second raised layer also reduces the influence by the alignment film on the second substrate upon the adhesion force between the sealant and the sealant region of the second substrate.

The step of cell-assembling the first substrate and the second substrate comprises providing the first substrate and the second substrate facing each other, and fixing the both together with a sealant to form a liquid crystal cell for containing the liquid crystal material therebetween.

Therefore, with the method for manufacturing the display panel as provided in the present embodiment, the display quality of the display panel is improved while the border of the display panel is kept narrow.

Third Embodiment

On the basis of the second embodiment, also with reference to FIG. 4, the present invention is further described by taking the method for manufacturing the display panel having the first substrate as the color filter substrate and having the second substrate as the array substrate as an example, but the present invention is not limited thereto.

In the step 101, one example of forming a first raised layer pattern in the sealant region of the first substrate such that the sealant region of the first substrate is higher than the display region of the first substrate (taking the first substrate as the color filter substrate for example) comprises: firstly, forming a red color filter layer pattern 11 in the sealant region of the color filter substrate; secondly, forming a green color filter layer pattern 12 on the red color filter layer pattern 11; and then forming a blue color filter layer pattern 13 on the green color filter layer pattern 12, thus the first raised layer 51 is formed by a stack of the red color filter layer pattern 11, the green color filter layer pattern 12, and the blue color filter layer pattern 13.

In a conventional process, the red color filter layer pattern 11, the green color filter layer pattern 12, and the blue color filter layer pattern 13 only in the display region are remained, but in the present embodiment, the red color filter layer pattern 11, the green color filter layer pattern 12, and the blue color filter layer pattern 13 in the sealant region are also remained to form the first raised layer pattern.

Of course, the first raised layer pattern may also be formed by a stack of any one or two layers among the red color filter layer pattern 11, the green color filter layer pattern 12, and the blue color filter layer pattern 13. That is to say, during the manufacturing process, any one or two layers of the red color filter layer pattern 11, the green color filter layer pattern 12, and the blue color filter layer pattern 13 may be remained to form the first raised layer pattern. Moreover, the order to form the red, green and blue color filter layer patterns is not limited to the above-mentioned order and can be conducted in any other suitable order.

It is noted that the embodiment of the present invention is described in detail by way of example in which the first color filter layer of the color filter sheet is the red color filter layer, the second color filter layer is the green color filter layer and the third color filter layer is the blue color filter layer, but the order and the color filter layers are not limited thereto, and in addition to the RUB (red, green and blue) type, the color filter sheet may also be RGBY (red, green, blue and yellow) type, CMYK (cyan, magenta, yellow and black) type, and so on, which is common in the display field.

One example of the step 103 of forming the alignment film in the display region of the first substrate (the first substrate is the color filter substrate, for example) may comprise the following process:

transferring decomposition-type photo-alignment liquid onto the color filter substrate such that the photo-alignment liquid on the first raised layer pattern flows to the non-display region between the sealant region of the color filter substrate and the display region of the color filter substrate, that is, the alignment film formed on the raised layer pattern becomes thin;

irradiating the color filter substrate with UV light in a certain direction such that the molecules in the alignment film matching with the polarization direction of the UV light undergo chain-broken reaction to decompose into small molecules, causing the alignment film further thin;

washing the color filter substrate to remove the small molecules to cause the alignment film still further thin, and removing the alignment layer of the alignment film on the first raised layer pattern to greatly reduce the influence on the sealant by the alignment film and hence improve the display quality of the display panel.

In the present embodiment and the following embodiments, when transferring the decomposition type photo-alignment liquid, the area where the photo-alignment liquid is transferred to the alignment film formed on the color filter substrate and the array substrate is larger than the area of the display region.

Furthermore, in order to make the alignment film on the first raised layer pattern thinner, between the step of irradiating the color substrate with the UV light in a certain direction and the step of washing the color filter substrate, the method may further comprise the following process: exposing the sealant region of the color filter substrate to full-polarization UV light by using a mask plate which covers the display region and its neighboring region of the color filter substrate while leaving the first raised layer pattern uncovered such that the first raised layer pattern can be exposed to the full-polarization UV light. Since the light in various polarization directions is used, the molecule chains in various directions in the alignment film on the first raised layer pattern are all subjected to decomposition reaction. When the color filter substrate is washed in this state, the alignment film on the first raised layer pattern is hardly remained.

Fourth Embodiment

On the basis of the second embodiment, the present invention is further described by way of example of the method for manufacturing the display panel having the first substrate as the color filter substrate and having the second substrate as the array substrate, but the present invention is not limited thereto.

In the step 101, one example of forming a first raised layer pattern in the sealant region of the first substrate such that the sealant region of the first substrate is higher than the display region of the first substrate (taking the first substrate as the color filter substrate, for example) comprises the following process:

on the color filter substrate, forming a layer of spacer which is used to form the first raised layer pattern. Of course, the first raised layer pattern may be formed by one layer or a multi-layer stack of the red color filter layer patter 11, the green color filter layer pattern 12, the blue color filter layer pattern 13 and the spacer layer.

One example of the step 103 of forming the alignment film in the display region of the first substrate (the first substrate is the color filter substrate, for example) may comprise the following process:

transferring a decomposition-type photo-alignment film onto the color filter substrate such that the photo-alignment liquid on the first raised layer pattern flows to the non-display region between the sealant region of the color filter substrate and the display region of the color filter substrate, that is, the alignment film formed on the raised layer pattern becomes thin;

irradiating the color filter substrate with UV light in a certain direction such that the molecules in the alignment film matching with the polarization direction of the UV light are subjected to a chain-broken reaction to decompose into small molecules, causing the alignment film further thin;

washing the color filter substrate to remove the small molecules to cause the alignment film still further thin, and removing the alignment layer of the alignment film on the first raised layer pattern to greatly reduce the influence on the sealant by the alignment film and hence improve the display quality of the display panel.

Furthermore, in order to make the alignment film on the first raised layer pattern thinner, between the step of irradiating the color substrate by the UV light in a certain direction and the step of washing the color filter substrate, the method may further comprise the following process: exposing the sealant region of the color filter substrate to full-polarization UV light by using a mask plate which covers the display region and its neighboring region of the color filter substrate while leaving the first raised layer pattern uncovered such that the first raised layer pattern can be exposed to the full-polarization UV light. Since the light in various polarization directions is used, the molecule chains in various directions in the alignment film on the first raised layer pattern are all subjected to decomposition reaction. When the color filter substrate is washed in this state, the alignment film on the first raised layer pattern is hardly remained.

Fifth Embodiment

On the basis of the second embodiment, the present invention is further described by way of example of the method for manufacturing the display panel having the first substrate as the color filter substrate and having the second substrate as the array substrate, but the present invention is not limited thereto.

In the step 101, one example of forming a first raised layer pattern in the sealant region of the first substrate such that the sealant region of the first substrate is higher than the display region of the first substrate (taking the first substrate as the color filter substrate, for example) comprises the following process: forming a layer of photoresist material on the color filter substrate, the photoresist material layer forming the first raised layer pattern.

For example, after the photoresist material layer is formed on the color filter substrate, the color filter substrate is exposed by using a mask plate, the photoresist material layer in the sealant region of the color filter substrate is remained to form the first raised layer pattern.

The photoresist can be classified into positive photoresist or negative photoresist. When the used photoresist is a negative photoresist, the mask plate for fixing the sealant can be used to expose the color filter substrate as well, and the photoresist material layer in the sealant region is remained to form the first raised layer pattern; and when the used photoresist is a positive photoresist, it is necessary to prepare another exposure mask plate.

One example of the step 103 of forming the alignment film in the display region of the first substrate (the first substrate is the color filter substrate, for example) may comprise the following process:

transferring a decomposition-type photo-alignment film onto the color filter substrate such that the photo-alignment liquid on the first raised layer pattern flows to the non-display region between the sealant region of the color filter substrate and the display region of the color filter substrate, that is, the alignment film formed on the raised layer pattern becomes thin;

irradiating the color filter substrate with UV light in a certain direction such that the molecules in the alignment film matching with the polarization direction of the UV light are subjected to a chain-broken reaction to decompose into small molecules, causing the alignment film further thin;

washing the color filter substrate to remove the small molecules to cause the alignment film still further thin, and removing the alignment layer of the alignment film on the first raised layer pattern to greatly reduce the influence on the sealant by the alignment film and hence improve the display quality of the display panel.

Furthermore, in order to make the alignment film on the first raised layer pattern thinner, between the step of irradiating the color substrate by the UV light in a certain direction and the step of washing the color filter substrate, the method may further comprise the following process: exposing the sealant region of the color filter substrate to full-polarization UV light by using a mask plate which covers the display region and its neighboring region of the color filter substrate while leaving the first raised layer pattern uncovered such that the first raised layer pattern will be exposed to the full-polarization UV light. Since the light in various polarization directions is used, the molecule chain in various directions in the alignment film on the first raised layer pattern are all subjected to decomposition reaction. When the color filter substrate is washed in this state, the alignment film on the first raised layer pattern is hardly remained.

Furthermore, in another example, the technology for removing the photoresist may also be employed such that the sealant region comprise no alignment film and thus avoids the influence upon the adhesivity of the sealant by the alignment film.

Sixth Embodiment

On the basis of the second embodiment, the present invention is further described by way of example of the method for manufacturing the display panel having the first substrate as the color filter substrate and having the second substrate as the array substrate, but the present invention is not limited thereto.

Further with reference to FIG. 5, one example of the step 102 of forming a second raised layer pattern in the sealant region of the second substrate such that the sealant region of the second substrate is higher than the display region of the second substrate (described by way of example that the second substrate is an array substrate) comprises: on the array substrate, forming a spacer which forms the second raised layer pattern.

One example of the step 103 of forming the alignment film in the display region of the second substrate (described by way of example that the second substrate is an array substrate) may comprise the following process:

transferring a decomposition-type photo-alignment film onto the array substrate such that the photo-alignment liquid on the second raised layer pattern flows to the non-display region between the sealant region of the array substrate and the display region of the array substrate, that is, the alignment film formed on the raised layer pattern becomes thin;

irradiating the array substrate with UV light in a certain direction such that the molecules in the alignment film matching with the polarization direction of the UV light are subjected to a chain-broken reaction to decompose into small molecules, causing the alignment film further thin;

washing the array substrate to remove the small molecules to cause the alignment film still further thin, and removing the alignment layer of the alignment film on the second raised layer pattern to greatly reduce the influence on the sealant by the alignment film and hence improve the display quality of the display panel.

Furthermore, in order to make the alignment film on the second raised layer pattern thinner, between the step of irradiating the color substrate by the UV light in a certain direction and the step of washing the array substrate, the method may further comprise the following process: exposing the sealant region of the array substrate to full-polarization UV light by using a mask plate which covers the display region and its neighboring region of the array substrate while leaving the first raised layer pattern uncovered such that the second raised layer pattern will be exposed to the full-polarization UV light. Since the light in various polarization directions is used, the molecule chains in various directions in the alignment film on the second raised layer pattern are all subjected to decomposition reaction. When the array substrate is washed in this state, the alignment film on the second raised layer pattern is hardly remained.

Seventh Embodiment

On the basis of the second embodiment, the present invention is further described by way of example of the method for manufacturing the display panel having the first substrate as the color filter substrate and having the second substrate as the array substrate, but the present invention is not limited thereto.

One example of the step 102 of forming a second raised layer pattern in the sealant region of the second substrate such that the sealant region of the second substrate is higher than the display region of the second substrate (described by way of example that the second substrate is an array substrate) comprises: forming a layer of photoresist material on the array substrate, the photoresist material layer forming the second raised layer pattern.

For example, after the photoresist material layer is formed on the array substrate, the array substrate is exposed by using a mask plate, the photoresist material layer in the sealant region of the array substrate is remained to form the first raised layer pattern.

The photoresist can be classified into positive photoresist or negative photoresist. When the used photoresist is a negative photoresist, the mask plate for fixing the sealant is used to expose the array substrate, and the photoresist material layer in the sealant region is remained, to form the second raised layer pattern; and when the used photoresist is a positive photoresist, it is necessary to prepare another exposure mask plate.

One example of the step 103 of forming the alignment film in the display region of the second substrate (described by way of example that the second substrate is an array substrate) may comprise the following process:

transferring a decomposition-type photo-alignment film onto the array substrate such that the photo-alignment liquid on the second raised layer pattern flows to the non-display region between the sealant region of the array substrate and the display region of the array substrate, that is, the alignment film formed on the raised layer pattern becomes thin;

irradiating the array substrate with UV light in a certain direction such that the molecules in the alignment film matching with the polarization direction of the UV light are subjected to a chain-broken reaction to decompose into small molecules, causing the alignment film further thin;

washing the array substrate to remove the small molecules to cause the alignment film still further thin, and removing the alignment layer of the alignment film on the second raised layer pattern to greatly reduce the influence on the sealant by the alignment film and hence improve the display quality of the display panel.

Furthermore, in order to make the alignment film on the second raised layer pattern thinner, between the step of irradiating the color substrate by the UV light in certain direction and the step of washing the array substrate, the method may further comprise the following process: exposing the sealant region of the array substrate to full-polarization UV light by using a mask plate which covers the display region and its neighboring region of the array substrate while leaving the first raised layer pattern uncovered such that the second raised layer pattern will be exposed to the full-polarization UV light. Since the light in various polarization directions is used, the molecule chains in various directions in the alignment film on the second raised layer pattern are all subjected to decomposition reaction. When the array substrate is washed in this state, the alignment film on the second raised layer pattern is hardly remained.

Furthermore, in another example, the technology for removing the photoresist may also be employed such that the sealant region comprises no alignment film and thus avoids the influence upon the adhesivity of the sealant by the alignment film.

For example, the first raised layer pattern in the color filter substrate of the display panel may be formed by any one method as described above in the third embodiment, the fourth embodiment or the fifth embodiment, and the second raised layer pattern in the array substrate may be formed by any method as described above in the sixth embodiment or seventh embodiment. Herein, the method for forming the first raised layer pattern on the color filter substrate and the method for forming the second raised layer pattern on the array substrate may be arbitrarily combined and will not described herein in further detail.

Eighth Embodiment

The present embodiment further provides a display device comprising the above described display panel. Since the display panel has improved display quality, the display device as provided in the present embodiment will also have improved display quality.

The above display device may be a mobile phone, a tablet computer, a monitor, a notebook computer, a navigator, and any product or component having display function.

In the display panel as provided in the present invention, the influence by the upper alignment layer of the alignment film upon the adhesion force of the sealant is avoided, and the display quality is improved and a narrow border can be obtained.

What are described above is related to the illustrative embodiments of the disclosure only and not limitative to the scope of the disclosure; the scopes of the disclosure are defined by the accompanying claims.

The invention claimed is:

1. A display panel having a display region and a non-display region, comprising:
a first substrate and a second substrate oppositely provided and a layer of liquid crystal molecule located between the first substrate and the second substrate, wherein the first substrate and the second substrate each are provided with an alignment film at a position corresponding to the display region, and each are provided with a sealant region for applying sealant at a position corresponding to the non-display region, wherein the sealant region on a surface of the first substrate facing the liquid crystal molecule layer is provided with a first raised layer by which the sealant region of the first substrate is higher than the display region thereof, wherein only a base layer of the alignment film is disposed between the first raised layer and the sealant region; and the sealant region on a surface of the second substrate facing the liquid crystal molecule layer is provided with a second raised layer by which the sealant region of the second substrate is higher than the display region thereof, wherein only a base layer of the alignment film is disposed between the second raised layer and the sealant region.

2. The display panel as claimed in claim 1, wherein the first raised layer or the second raised layer is formed by one layer of the color filter layers of the color filter sheet or by a stack of layers of the color filter layers of the color filter sheet.

3. The display panel as claimed in claim 1, wherein the first raised layer and/or the second raised layer is formed of a metal material, a metal alloy material, a resin material or a photoresist material.

4. The display panel as claimed in claim 1, further comprising a spacer layer located between the first substrate and the second substrate, wherein the first raised layer or the second raised layer is formed by the spacer layer.

5. The display panel as claimed in claim 1, further comprising a spacer layer located between the first substrate and the second substrate, wherein the first raised layer or the second raised layer is formed by one layer from the color filter layers of the color filter sheet and the spacer layer or by a stack of layers from the color filter layers of the color filter sheet and the spacer layer.

6. The display panel as claimed in claim 1, wherein the first raised layer and the second raised layer have a thickness less than or equal to half of a cell gap of a liquid crystal cell.

7. A method for manufacturing a display panel having a display region and a non-display region, and the display panel comprising a first substrate and a second substrate which are oppositely provided and a layer of liquid crystal molecule provided between the first substrate and the second substrate, the first substrate and the second substrate, corresponding to the non-display region, being respectively provided with a sealant region for applying sealant, the method comprising:

forming a first raised layer pattern in the sealant region of the first substrate such that the sealant region of the first substrate is higher than the display region of the first substrate;

forming a second raised layer pattern in the sealant region of the second substrate such that the sealant region of the second substrate is higher than the display region of the second substrate;

forming an alignment film in the display region of the first substrate and the display region of the second substrate, wherein only a base layer of the alignment film is disposed between the first raised layer and the sealant region, and only a base layer of the alignment film is disposed between the second raised layer and the sealant region;

cell-assembling the first substrate and the second substrate; and providing liquid crystal molecules between the first substrate and the second substrate.

8. The method for manufacturing the display panel as claimed in claim 7, wherein forming of the first raised layer pattern in the sealant region of the first substrate or forming of the second raised layer pattern in the sealant region of the second substrate comprises:

forming a first color filter layer pattern in the sealant region of the first substrate or the sealant region of the second substrate;

forming a second color filter layer pattern on the first color filter layer pattern;

forming a third color filter layer pattern on the second color filter layer pattern;

the first, second and third color filter layer patterns stacking to form the first raised layer pattern or the second raised layer pattern.

9. The method for manufacturing the display panel as claimed in claim 7, wherein forming of the first raised layer pattern in the sealant region of the first substrate or forming of the second raised layer pattern in the sealant region of the second substrate comprises:

forming a spacer in the sealant region of the first substrate or in the sealant region of the second substrate, wherein the spacer forms the first raised layer patter or the second raised layer pattern.

10. The method for manufacturing the display panel as claimed in claim 7, wherein forming of the first raised layer pattern in the sealant region of the first substrate or forming of the second raised layer pattern in the sealant region of the second substrate comprises:

forming a layer of photoresist material in the sealant region of the first substrate and/or in the sealant region of the second substrate, wherein the photoresist material layer forming the first raised layer patter and/or the second raised layer pattern.

11. The method for manufacturing the display panel as claimed in claim 7, wherein respectively forming of the alignment film in the display region of the first substrate and the display region of the second substrate comprises:

transferring decomposition type photo-alignment liquid on the first substrate and the second substrate so that the photo-alignment liquid on the first raised layer pattern and the second raised layer pattern is flowed to the non-display region respectively between the sealant regions of the first substrate and the second substrate and the display regions thereof;

irradiating the first substrate and the second substrate with UV light in a certain direction; and washing the first substrate and the second substrate.

12. The method for manufacturing the display panel as claimed in claim 11, between a step of irradiating the first substrate and the second substrate with UV light in a certain direction and a step of washing the first substrate and the second substrate, further comprising:

exposing the sealant region of the first substrate and the sealant region of the second substrate to full-polarization UV light by using a mask plate.

13. A display device comprising a display panel as claimed in claim 1.

* * * * *